United States Patent
Matthias et al.

(10) Patent No.: US 11,654,471 B2
(45) Date of Patent: May 23, 2023

(54) METHOD FOR PRODUCING A HOLLOW VALVE FOR INTERNAL COMBUSTION ENGINES

(71) Applicant: FEDERAL-MOGUL VALVETRAIN GMBH, Barsinghausen (DE)

(72) Inventors: Thorsten Matthias, Garbense (DE); Antonius Wolking, Barsinghausen (DE); Guido Bayard, Dortmund (DE)

(73) Assignee: Federal-Mogul Valvetrain GmbH, Barsinghausen (DE)

( * ) Notice: Subject to any disclaimer, the term of this patent is extended or adjusted under 35 U.S.C. 154(b) by 165 days.

(21) Appl. No.: 17/056,482

(22) PCT Filed: Jan. 31, 2019

(86) PCT No.: PCT/EP2019/052372
§ 371 (c)(1),
(2) Date: Nov. 18, 2020

(87) PCT Pub. No.: WO2019/223908
PCT Pub. Date: Nov. 28, 2019

(65) Prior Publication Data
US 2021/0370376 A1      Dec. 2, 2021

(30) Foreign Application Priority Data
May 23, 2018    (DE) .................. 10 2018 112 291.8

(51) Int. Cl.
*B21D 22/16*    (2006.01)
*B21K 1/22*    (2006.01)
(Continued)

(52) U.S. Cl.
CPC ............. *B21D 22/16* (2013.01); *B21K 1/22* (2013.01); *F01L 3/14* (2013.01); *F01L 3/20* (2013.01);
(Continued)

(58) Field of Classification Search
CPC ... B21D 22/16; B21K 1/22; F01L 3/14; F01L 3/20; F01L 2303/00; F16K 1/36; F16K 49/007
See application file for complete search history.

(56) References Cited

U.S. PATENT DOCUMENTS 2,009,996 A  *  8/1935  Gering, Jr. .............. B21K 21/16
                                                             29/423
6,006,713 A    12/1999  Gebauer
(Continued)

FOREIGN PATENT DOCUMENTS

DE    102015220891 A1    4/2017
EP       0151976 A2  *  8/1985  ............. B21B 19/12
(Continued)

OTHER PUBLICATIONS

International Search Report, dated Apr. 12, 2019 (PCT/EP2019/052372).

*Primary Examiner* — Ryan J. Walters
(74) *Attorney, Agent, or Firm* — Robert L. Stearns; Dickinson Wright, PLLC

(57) ABSTRACT

A production method for a valve body of a hollow valve includes providing a preform with a valve head and a tubular wall which surrounds a cylindrical cavity. The tubular wall is flow formed above a flow forming mandrel which is inserted into the cavity in order to increase a length of the tubular wall. A hollow valve produced by flow forming is also disclosed.

13 Claims, 1 Drawing Sheet

Figures 1A, 1B, 1C, 1D, 1E, 1F:
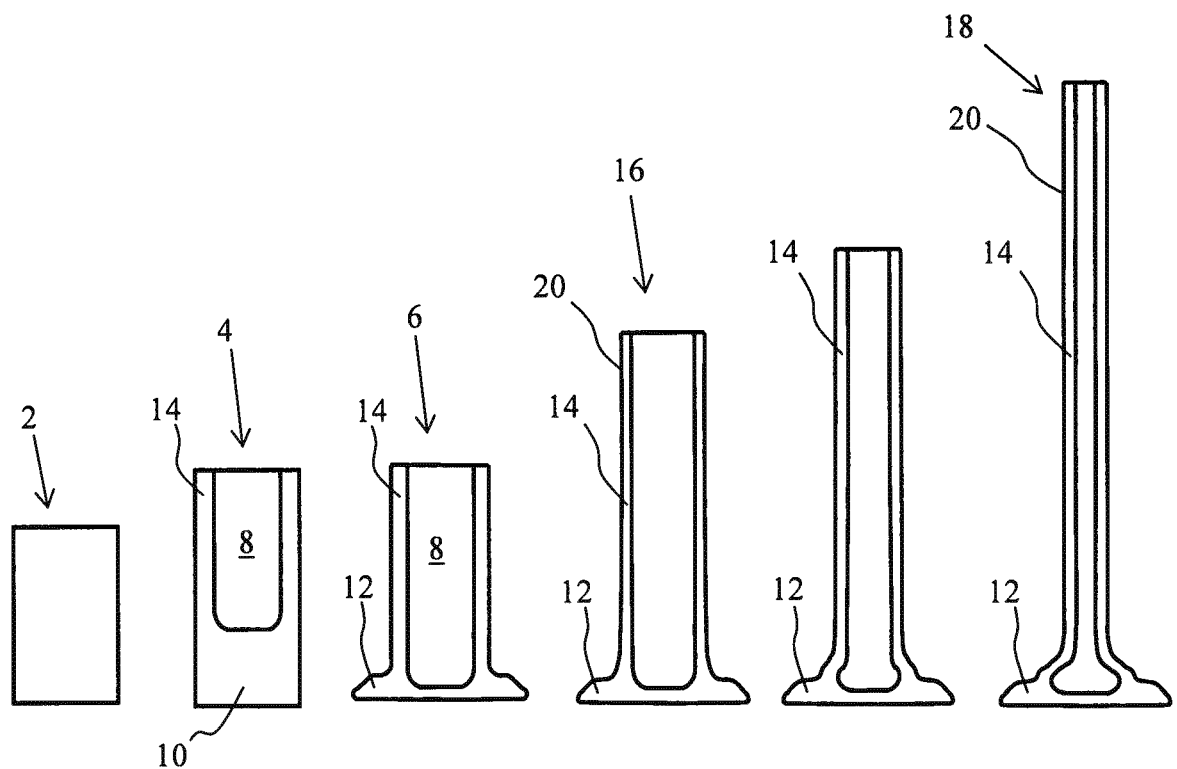

(51) Int. Cl.
*F01L 3/14* (2006.01)
*F01L 3/20* (2006.01)
*F16K 1/36* (2006.01)
*F16K 49/00* (2006.01)

(52) U.S. Cl.
CPC ............ *F01L 2303/00* (2020.05); *F16K 1/36* (2013.01); *F16K 49/007* (2013.01)

(56) References Cited

U.S. PATENT DOCUMENTS

| | | | |
|---|---|---|---|
| 6,161,285 A | | 12/2000 | Eberhardt et al. |
| 9,302,317 B2 | * | 4/2016 | Morii ........................ B21K 1/24 |
| 9,427,795 B2 | * | 8/2016 | Morii ........................ F01L 3/14 |
| 10,526,933 B2 | * | 1/2020 | Morii ........................ F01L 3/20 |
| 11,313,257 B2 | * | 4/2022 | Matthias ............... F16K 49/007 |
| 2014/0033533 A1 | | 2/2014 | Morii et al. |
| 2018/0304344 A1 | | 10/2018 | Kellermann |
| 2020/0039008 A1 | | 2/2020 | Matthias et al. |

FOREIGN PATENT DOCUMENTS

| | | | |
|---|---|---|---|
| EP | 0898055 A1 | | 2/1999 |
| EP | 0965412 A1 | | 12/1999 |
| EP | 2690262 A1 | | 1/2014 |
| GB | 461940 A | | 2/1937 |
| JP | 2014166644 A | * | 9/2014 |
| JP | 2014166644 A | | 9/2014 |
| WO | 2011104903 A1 | | 9/2011 |
| WO | 2018149518 A1 | | 8/2018 |

\* cited by examiner

METHOD FOR PRODUCING A HOLLOW VALVE FOR INTERNAL COMBUSTION ENGINES

BACKGROUND

1. Technical Field

The present invention relates to a method for producing hollow valves or hollow valves, respectively, for internal combustion engines and hollow valves produced therewith.

2. Related Art

In internal combustion engines, inlet and outlet valves are components, which are thermally and mechanically highly stressed. A sufficient cooling is thus necessary in order to ensure a permanent functionality of the valves. Poppet valves are advantageous thereby compared to full shaft valves and hollow shaft valves (i.e. a hollow valve, in the case of which a cavity is provided only in the shaft), because a cavity is present in the shaft as well as in the valve head, whereby an improved internal cooling can be achieved by means of a cooling medium, e.g. sodium. Further advantages are a smaller weight, the avoidance of hot spots, and a $CO_2$ reduction.

Hollow valves are usually produced by a combination of different methods, such as, e.g., forging, turning, and welding. In particular the turning or milling of the cavity is cost-intensive thereby. Welding points at the plate surface or at other points, which are critical for operational reasons, should also be avoided. A further disadvantage of known methods is that a large number of processing steps is often necessary. EP 0898055 A1, for example, relates to a poppet valve, which is produced by closing a hollow blank by means of welding. It is moreover known from DE 102015220891 A1 to produce an internally cooled valve by forming a cup-shaped preform by means of rolling.

It is thus the object of the present invention to provide a production method for hollow valves or for a valve body, respectively, for hollow valves, which does not have the mentioned disadvantages and which simultaneously has a high productivity and good material utilization.

SUMMARY

A method for producing a valve body of a hollow valve comprises the steps of providing a preform comprising a valve head and a tubular wall, which surrounds a cylindrical cavity, and flow forming the tubular wall above a flow forming mandrel, which is inserted into the cavity, in order to increase a length of the tubular wall.

According to an aspect, the provision of the preform can comprise: providing a bowl-shaped semi-finished product, wherein the semi-finished product has the tubular wall, which surrounds the cylindrical cavity of the semi-finished product, and a bottom section; and molding the valve head from the bottom section.

According to a further aspect, the provision of the bowl-shaped semi-finished product can comprise: providing an at least partially cylindrical blank; and molding the bowl-shaped semi-finished product from the blank.

According to a further aspect, the molding of the bowl-shaped semi-finished product can take place by means of extrusion or forging.

According to a further aspect, the molding of the valve head can take place by means of extrusion or forging.

According to a further aspect, several flow forming rollers can be used in the flow forming, wherein preferably three flow forming rollers are used.

According to a further aspect, the several flow forming rollers can be radially and axially offset to one another during the flow forming.

According to a further aspect, the method can furthermore comprise: a further flow forming of the tubular wall without flow forming mandrel.

According to a further aspect, the method can furthermore comprise: reducing an outer diameter of the tubular wall after the flow forming.

According to a further aspect, the reducing of the outer diameter of the tubular wall can take place by means of rotary swaging or feeding.

According to a further aspect, the reducing of the outer diameter of the tubular wall can take place without mandrel.

According to a further aspect, the reducing of the outer diameter of the tubular wall can take place with a mandrel, which is inserted into the cavity.

According to a further aspect, the method can furthermore comprise: filling a cooling medium, in particular sodium, into the cavity; and closing the cavity.

The problem is furthermore solved by hollow valve, which comprises a valve body, which was produced by using the above method.

THE DRAWING

Figure 2:
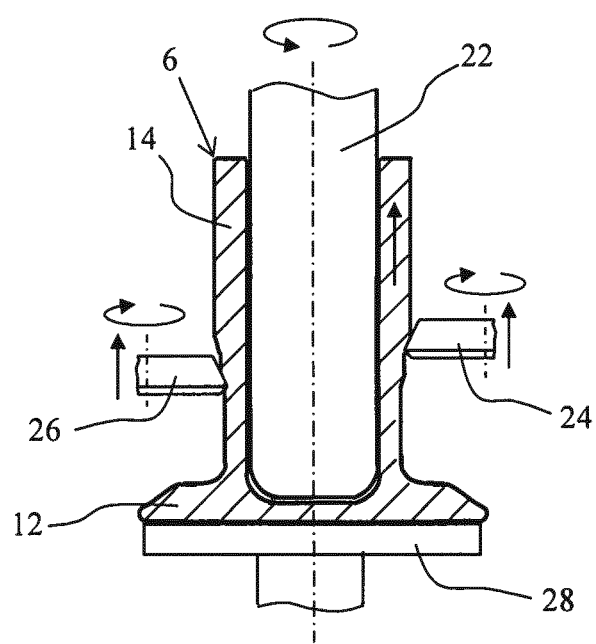

Exemplary embodiments of the invention will be described in more detail below with reference to the figures, wherein:

FIGS. 1A-1F show different intermediate steps of the production according to the invention of a valve body of a hollow valve (illustrated in FIG. 1D or FIG. 1F, respectively) from a blank (illustrated in FIG. 1A); and FIG. 2 shows a sectional view during the flow forming.

Hereinafter, identical reference numerals will be used for identical or similar elements or components in the description as well as in the drawing. A list of reference numerals is moreover specified, which is valid for all figures. The embodiments illustrated in the figures are only schematic and do not necessarily represent the actual size ratios.

DETAILED DESCRIPTION OF THE INVENTION

Different intermediate stages of the production method according to the invention are illustrated in FIGS. 1A to 1F in sectional views, whereby optional or preferred production steps/intermediate stages, respectively, are also illustrated.

A blank 2 made of a valve steel, which is known to the person of skill in the art, preferably serves as starting point, see FIG. 1A. The blank has an at least partially cylindrical shape, preferably a circular cylindrical shape, according to the circular shape of the valve body or valve, respectively, which is to be produced.

The blank 2 is formed into a bowl-shaped semi-finished product (or workpiece, respectively) 4, which is illustrated in FIG. 1B. The semi-finished product 4 in the shape of a bowl comprises a bottom section 10, from which a valve head (or valve plate, respectively) 12 is formed later, and a tubular wall (or ring-shaped wall, respectively) 14, which surrounds a cylindrical, preferably circular cylindrical, cavity 8 of the bowl-shaped semi-finished product 4, and from which a valve shaft 20 is formed later. Material can thereby possibly flow between bottom section 10 and tubular wall 14 during the subsequent forming steps. More generally, the bowl-shaped semi-finished material 4 is provided directly according to the invention; the method then thus starts by providing the bowl-shaped semi-finished product 4, which is illustrated in FIG. 1B.

The valve head 12 is molded from the bottom section 10 in a subsequent forming step. A preform 6 of the valve body obtained thereby is illustrated in FIG. 1C.

The forming of the blank 2 into a bowl-shaped workpiece 4 as well as the molding of the valve head 12 from the bottom section 10 can be carried out, e.g., by means of a warm or cold forming process. Extrusion or forging is preferably used. In the extrusion, a punch is pressed into the blank 2 or the semi-finished product 4, respectively, to form the cavity 8 or the valve head 12, respectively, i.e. it is essentially (bowl) backward extrusion or lateral extrusion, respectively. The preform 6 can also be molded directly from the blank 2 in a single forming step, e.g. forging or extrusion.

An axial length of the tubular wall 14 is enlarged in the next machining step, from FIG. 1C to FIG. 1D. "Axial" refers here to the direction defined by the tubular wall 14 (i.e. the later shaft), thus to the (central) axis of the tubular wall; "radial" is thus a direction orthogonally to the axial direction. A length of the tubular wall 6 is thus measured in the axial direction.

According to the invention, flow forming or cylinder flow forming, respectively, is carried out for that purpose via a flow forming mandrel 22; see FIG. 2. In the flow forming, the preform rotates and at least one flow forming roller 24, 26, which co-rotates due to friction engagement, is pushed against the outer side of the tubular wall, and is moved in the axial direction, thus resulting in a plastic shape change. The incremental forming associated therewith leads to an advantageous cold work hardening of the machined steel. As a whole, the wall thickness of the tubular wall decreases while the axial length of the tubular wall increases simultaneously. The at least one flow forming roller is optionally displaced several times in the axial direction until the desired length increase or wall thickness decrease, respectively, is reached. The radial distance of the at least one flow forming roller from the axis of the tubular wall is thereby successively decreased in the case of consecutive passes.

Due to the used flow forming mandrel, the flow forming thus essentially leads to an elongation of the tubular wall 14, wherein the outer diameter thereof decreases slightly (according to the decrease of the wall thickness). If a larger decrease of the outer diameter is desired, a flow forming with several flow forming rollers can also take place without flow forming mandrel.

If dimensions of the preform 6 and parameters of the flow forming are selected such that the length of the tubular wall 14 attained by means of the flow forming, the outer diameter attained by means of the flow forming, and an inner diameter of the tubular wall 14 of the preform (which corresponds to a diameter of the flow forming mandrel) correspond to the desired dimensions of the hollow valve to be produced, a valve body 16 for a hollow shaft valve can be obtained in this way (see FIG. 1D, whereby it should be noted that the relative dimensions shown in the figures do not have to correspond to the actual relative dimensions, the diameter of the valve plate/head in relation to the shaft diameter is illustrated to be smaller in FIG. 1D than in the case of a common actual valve, the shaft diameter is likewise illustrated to be larger than usual in relation to the length of the shaft 20).

Finally (from FIG. 1D via FIG. 1E to FIG. 1F), the outer diameter of the tubular wall 14 is optionally reduced in order to obtain a completed valve body 18 for a poppet valve, the valve shaft 20 of which has a predetermined outer diameter, i.e. a desired target diameter; see FIG. 1F. This forming step preferably takes place without inserted mandrel, so that the diameter can be decreased effectively. In addition to a decrease of the outer diameter, this step also leads to a further elongation of the tubular wall 14 and, if performed without mandrel, to an increase of the wall thickness of the tubular wall 14. The wall thickness may thus need to be set somewhat smaller in the preceding flow forming step, in order to obtain a certain wall thickness in the final step in consideration of the thickness increase, and thus a certain inner diameter with given outer diameter D.

The reducing of the outer diameter of the tubular wall 14 can take place by means of rotary swaging or feeding ("necking", diameter decrease by constricting), wherein rotary swaging is preferred. In the case of the rotary swaging it is important that no further forming step of the valve body 18 for a poppet valve takes place after the rotary swaging for reducing the outer diameter of the tubular wall 14, because this would worsen the positive material properties obtained by the rotary swaging. Rotary swaging is thus the final forming step in this case.

The rotary swaging is an incremental pressure forming method, in the case of which the workpiece to be machined is struck in quick succession from different sides in the radial direction. Due to the pressure created thereby, the material quasi "flows", and the material structure is not distorted by tensile stresses. Rotary swaging is preferably carried out as cold forming method, i.e. below the recrystallization temperature of the machined material. It is thus an essential advantage of the use of rotary swaging as final forming step that compressive stresses are induced due to the radial application of force in-the rotary swaging, as a result of which the appearance of tensile stresses, which increase the susceptibility to tears, is prevented, this applies in particular for the edge layers of the hollow shaft. The rotary swaging thus cooperates with the above forming process of flow forming, which is likewise an incremental forming process, in an advantageous manner, so that optimal material properties, e.g. resistance, are obtained.

Further advantages of the rotary swaging as final forming step, compared to drawing methods or "necking" (feeding), are at hand due to a better surface quality, which can be attained, and due to a relative higher diameter reduction of the shaft for each step. Due to the high surface quality, which can be attained, and due to the fact that the tolerances, which can be observed in the rotary swaging, are very small, a finishing of the valve shaft is not necessary for the most part. Only an inferior surface quality or tolerance observation, respectively, can generally be achieved with free molding methods or compression methods, respectively, such as, e.g., necking. To reduce the outer diameter of the tubular wall, in particular no further method step should thus take place by means of a drawing method or necking after the rotary swaging.

To conclude the production process of the hollow valve, a cooling medium, e.g. sodium, can furthermore be filled into the cavity of the valve body via the end of the valve shaft, which is open to the outside, and this end of the valve shaft can subsequently be closed, e.g. by means of a valve shaft end piece, which is attached, for instance by means of friction welding or another welding method (not illustrated in the figures).

The reducing of the outer diameter can take place in several partial steps (an intermediate step is illustrated, for example, in FIG. 1E), whereby the individual partial steps can each optionally take place with or without mandrel (at the beginning of a partial step, the diameter of a mandrel can be smaller than the diameter of the cavity); a diameter of the mandrels of consecutive partial steps can also be decreased.

FIG. 2 illustrates the method step of the flow forming, which takes place between FIG. 1C and FIG. 1D, in a sectional illustration. A flow forming mandrel 22 is thereby inserted into the cavity of the preform 6. The flow forming mandrel rotates together with the preform 6 and a tailstock 28, which supports the preform at the valve bottom. Two flow forming rollers 24, 26, which are located opposite one another and which likewise rotate by means of frictional engagement, are pushed against the tubular wall 14. The flow forming rollers 24, 26 are moved relative to the preform in the axial direction, thus resulting in a plastic deformation of the tubular wall 14, whereby the outer radius of the tubular wall 14 decreases and the length of the tubular wall 14 simultaneously increases (in the axial direction). The material of the tubular wall 14 thereby "flows" in the direction of movement of the flow forming rollers 24, 26 (synchronization flow forming rollers). The directions of rotation of the preform (together with flow forming mandrel and tailstock) and of the flow forming rollers, the direction of movement of the flow forming rollers 24, 26, and the flow direction of the material of the tubular wall 14 are suggested by means of arrows in the figure.

Two flow forming rollers 24, 26 are (partially) illustrated in FIG. 2 in an exemplary manner, the use of only one or of more than two flow forming rollers is likewise possible, whereby the use of two or three flow forming rollers is preferred. If several flow forming rollers are used, they are preferably distributed evenly over the circumference; i.e., in the case of two flow forming rollers, the angle (in the circumferential direction) between the flow forming rollers is approximately 180°, in the case of three flow forming rollers approximately 120°, etc. The preform is thus in particular also supported in all directions.

There is preferably a radial and an axial offset between the flow forming rollers, as illustrated in FIG. 2. Radial offset is to mean that the radial distance of the flow forming rollers 24, 26 from the central axis is different. The axial offset is attained in that the flow forming rollers 24, 26 are displaced staggered in time, whereby the order is (clearly) such that to begin with, the flow forming roller with the largest radial distance from the central axis is displaced, followed by that flow forming roller with the second-largest radial distance, etc. The displacement can be accelerated in this way because several radius or wall thickness reducing steps, respectively, can take place in one pass. Instead of a radial offset of flow forming rollers with the same diameter, flow forming rollers with different diameters can also be used.

The invention claimed is:

1. A method for producing a valve body of a hollow valve, comprising:
   providing a preform comprising a valve head at a closed end of the preform and a tubular wall, which surrounds a cylindrical cavity extending to an opposite open end of the preform;
   extending a flow forming mandrel into the cylindrical cavity through the open end and externally supporting the closed end with a tailstock such that the valve head is interposed between the tailstock on the outside of the valve head and the mandrel on an inside of the valve head,
   flow forming the tubular wall in order to increase a length of the tubular wall,
   wherein a plurality of flow forming rollers are used during the flow forming which are radially and axially offset to one another during the flow forming,
   wherein the flow forming mandrel rotates together with the preform and the tailstock during the flow forming.

2. The method according to claim 1, wherein flow forming the preform produces a bowl-shaped semi-finished product, wherein the semi-finished product has the tubular wall, which surrounds the cylindrical cavity of the semi-finished product, and a bottom section; and
   including molding the valve head from the bottom section.

3. The method according to claim 2, wherein the bowl-shaped semi-finished product provides:
   an at least partially cylindrical blank; and
   including molding the bowl-shaped semi-finished product from the blank.

4. The method according to claim 3, wherein the molding of the bowl-shaped semi-finished product takes place by means of extrusion or forging.

5. The method according to claim 2, wherein the molding of the valve head takes place by means of extrusion or forging.

6. The method according to claim 1, wherein at least three flow forming rollers are used.

7. The method according to claim 1 comprising:
   a further flow forming of the tubular wall without the assistance of the flow forming mandrel.

8. The method according to claim 1 comprising:
   reducing an outer diameter of the tubular wall after the flow forming.

9. The method according to claim 8, wherein the reducing of the outer diameter of the tubular wall takes place by means of rotary swaging or feeding.

10. The method according to claim 8, wherein the reducing of the outer diameter of the tubular wall takes place without a mandrel.

11. The method according to claim 8, wherein the reducing of the outer diameter of the tubular wall takes place with a mandrel inserted into the cavity.

12. The method according to claim 1, comprising:
    filling a cooling medium, into the cavity; and
    closing the cavity.

13. The method according to claim 12, wherein the medium is selected as sodium.

* * * * *